(12) United States Patent
Stavros

(10) Patent No.: US 11,543,062 B2
(45) Date of Patent: Jan. 3, 2023

(54) REVERSIBLE BRAKE TUBE CONNECTOR

(71) Applicant: Cooper-Standard Automotive Inc., Novi, MI (US)

(72) Inventor: Alexander John Stavros, Romeo, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 157 days.

(21) Appl. No.: 16/830,064

(22) Filed: Mar. 25, 2020

(65) Prior Publication Data

US 2021/0301959 A1 Sep. 30, 2021

(51) Int. Cl.
| | | |
|---|---|---|
| *F16L 33/28* | (2006.01) | |
| *F16L 33/22* | (2006.01) | |
| *B60T 17/04* | (2006.01) | |
| *F16L 19/028* | (2006.01) | |

(52) U.S. Cl.
CPC .......... *F16L 33/223* (2013.01); *B60T 17/043* (2013.01); *F16L 19/0283* (2013.01); *F16L 33/28* (2013.01)

(58) Field of Classification Search
CPC ..... F16L 33/223; F16L 33/28; F16L 19/0283; F16L 19/025; F16L 19/0286; F16L 19/028; B60T 17/043
See application file for complete search history.

(56) References Cited

U.S. PATENT DOCUMENTS

| | | | | |
|---|---|---|---|---|
| 1,484,295 A | * | 2/1924 | Bundy | ................ F16L 19/0283 |
| | | | | 285/329 |
| 5,279,124 A | * | 1/1994 | Aymond | ................ B60T 11/16 |
| | | | | 251/149.4 |
| 5,310,029 A | | 5/1994 | Kujawski | |

(Continued)

FOREIGN PATENT DOCUMENTS

| | | |
|---|---|---|
| CN | 200968465 Y | 10/2007 |
| EP | 1236946 A1 | 9/2002 |

(Continued)

OTHER PUBLICATIONS

European Search Report dated Jun. 20, 2019.
"European Search Report" for corresponding application dated Jun. 18, 2021.

*Primary Examiner* — Zachary T Dragicevich
*Assistant Examiner* — James A Linford
(74) *Attorney, Agent, or Firm* — Paschall & Associates, LLC; James C. Paschall

(57) ABSTRACT

A fluid connector assembly comprising a reversible connector body having female and male end portions. The male end portion having an outer diameter smaller than the outer diameter of the female end portion. The female end portion including an internal bore extending through the female end portion from an annular opening to an inner seat. The male end portion including an internal bore extending from an abutment face at a head end of the male end portion to an opening at the female end portion inner seat. A first tube (Continued)

having a concave flared end installed on the inner seat of the reversible connector body engages a spherical/convex flared end of a second tube installed on the abutting face of another reversible connector body when the male end portion of the another reversible connector body is installed in the female end portion of the reversible connector body.

5 Claims, 3 Drawing Sheets

(56) References Cited

U.S. PATENT DOCUMENTS

| | | | |
|---|---|---|---|
| 7,571,936 B2 * | 8/2009 | Schneider | F16B 39/02 |
| | | | 285/45 |
| 2003/0234537 A1 | 12/2003 | Malone | |
| 2004/0212191 A1 * | 10/2004 | Segal | F16L 33/223 |
| | | | 285/334.5 |
| 2009/0015008 A1 | 1/2009 | Pliassounov | |
| 2011/0204623 A1 | 8/2011 | Weick et al. | |

FOREIGN PATENT DOCUMENTS

| | | | | |
|---|---|---|---|---|
| FR | 1187512 A * | 9/1959 | | F16L 19/028 |
| FR | 2230923 A1 | 12/1974 | | |
| GB | 2126677 A * | 3/1984 | | F16B 7/02 |
| WO | WO-2016116558 A1 * | 7/2016 | | F16L 19/0243 |

* cited by examiner

REVERSIBLE BRAKE TUBE CONNECTOR

TECHNICAL FIELD

This invention relates to automotive high-pressure brake tube connectors having an elongated brake tube with flared ends. More specifically this disclosure is directed to a reversible connector that combines a concave (female) inner seat for a SAE double flared end with a (male type) spherical/convex ISO flare with the purpose of connecting and maintaining a fluid-tight seal between SAE and ISO brake tube flare ends of the type used in a motor vehicle to actuate the braking system.

BACKGROUND

Hydraulic fluid systems are commonly used in motor vehicle braking systems. A supply of hydraulic braking fluid is provided in a master cylinder and, upon actuation of the brake pedal, applied at elevated pressure (i.e., 2000 psi) to individual wheel cylinders. In turn, wheel cylinders urge frictional surfaces into contact to generate a braking force. Therefore, several component interfaces exist in motor vehicle braking systems that must maintain a relatively high brake fluid hydraulic pressure throughout the service of the braking system.

Threaded connectors are commonly used to attach brake tubing to the various braking system components in the manufacture of such braking systems. Such connectors typically include a nut having external threads situated over a flared tube end that is inserted into a mating threaded hole in the braking system component to which the tube is to be attached. Any leakage of the hydraulic brake fluid is unacceptable. Poor brake connector sealing robustness causes substantial repair labor and first run inhibition at the assembly plants.

Currently, there are two families of standardized mass-produced brake connectors utilized in the automotive industry. The first class is based on the interaction of a male type (convex) seat situated inside connector's port (hole/recess) and extending into it. Accordingly, a female (concave) flare with its inner surface dedicated for abutment against the seat with the purpose of forming the fluid seal, is required. This class is represented by the JASO/SAE connector design. Its nominal sealing surfaces' shape is a frustum (portion of a cone with cut off vertex). Its double inverted flare (funnel or trumpet) has inner (concave) frustum which is intended for sealing onto "external" (convex) frustum (seat) of the port. The design is defined by SAE J533 and JASO F402 standards (which are similar to each other).

The second class of tube flared connectors incorporates the reversed combination—a female type (concave) seat interacting with a male type (convex) flare. This class is represented by the ISO connector design. It incorporates the flare (bubble) with its external surface dedicated for abutment against the seat with the purpose of forming the fluid seal. Nominal shape of its sealing surface is also frustoconical. The frustoconical concave seat is an integrated part of the connector port (hole/recess) and there is no other portion extending into the port. The ISO design is defined by the SAE standard J1290.

Good and robust connector sealing may be expected only if adequate clamping force is developed onto the contact ring of sufficient size between the sealing surfaces. There is a fundamental shortcoming of frustum to frustum mating and therefore prior-art brake tube fittings are designed specifically for the type of tubing flare used. This required the use a specific fitting for the type of tubing flare used by the braking system. In many retrofitted braking systems, a combination of SAE and ISO tube flared connectors are used leading to a potential for fluid leaks, increased maintenance costs as well as, increased inventory costs for maintaining an inventory of specialized fittings.

Therefore, the present invention describes a single fitting that can be arranged to fit either SAE or ISO flared tubing and that can connect and make a fluid tight seal between brake line tubing having SAE and ISO flares.

SUMMARY

This disclosure provides a reversible fitting that combines a concave (female) inner seat for a SAE double flared tubing end with a (male type) convex ISO flare tubing end with the purpose of connecting and maintaining a fluid-tight seal between elongated tubes having SAE and ISO tube flare ends.

In a first embodiment, a fluid connector assembly comprises a connector body having a female end portion and a male end portion. The male end portion has an outer diameter that is smaller than an outer diameter of the female end portion. The female end portion includes an internal bore extending through the female end portion from an annular opening to an inner seat. The inner seat has a portion defining a concave frustoconical surface. The male end portion includes an internal bore axially aligned with the female bore extending from an opening at a head end of said male end portion to a second opening at the female end portion inner seat. An elongated tube having a concave flared end extends through the male bore from the first opening with the tubing flared end resting on the inner seat.

In a second embodiment, a fluid connector assembly comprises a connector body having a female end portion and a male end portion. The male end portion having an outer diameter that is smaller than an outer diameter of the female end portion. The male end portion including an internal bore extending from a first opening at a head end to a second opening at the female end portion. The head end including an abutting face disposed around the first opening. The female end portion includes an internal bore in axial alignment with the male bore extending through the female end portion from an opening at one end to the male bore second end. An elongated tube having a spherical/convex flared end extends through the female bore and the male bore. The spherical/convex flared end extends outward from the first opening at the head end with the spherical/convex flare resting on the abutting face.

In a third embodiment, a method for forming a fluidic connection is disclosed comprising providing a first connector body having a seat defining a concave frustoconical surface. A first elongated tube having a concave flared end portion is inserted into the first connector body, the flared end resting on the seat against said frustoconical surface. A second connector body having a head end and an abutting face has a second elongated tube having a spherical/convex end portion inserted into the second connector body with the spherical/convex end portion resting on the abutting face. The second connector body is inserted into the first connector body aligning the spherical/convex end portion of the second elongated tube to the concave flared end of the first elongated tube within an annular range and forcibly engaging the second connector body to said first connector body, the abutting face driving the spherical/convex end portion into the concave flared end portion forcing the concave flared end into said seat to form a fluidic seal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1-5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
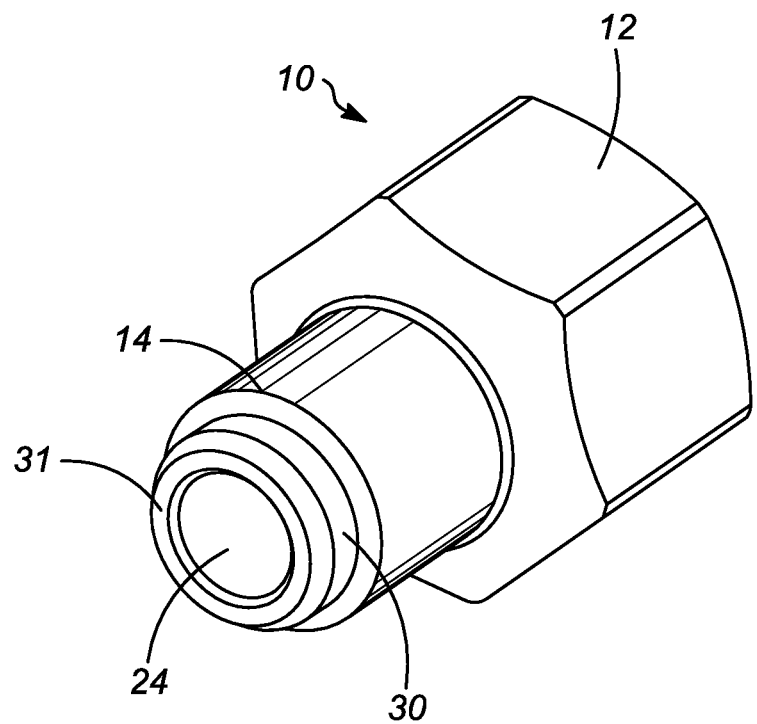
FIG. 1 is a front perspective view of an embodiment of the reversable brake tube connector according to this disclosure.
Figure 2:
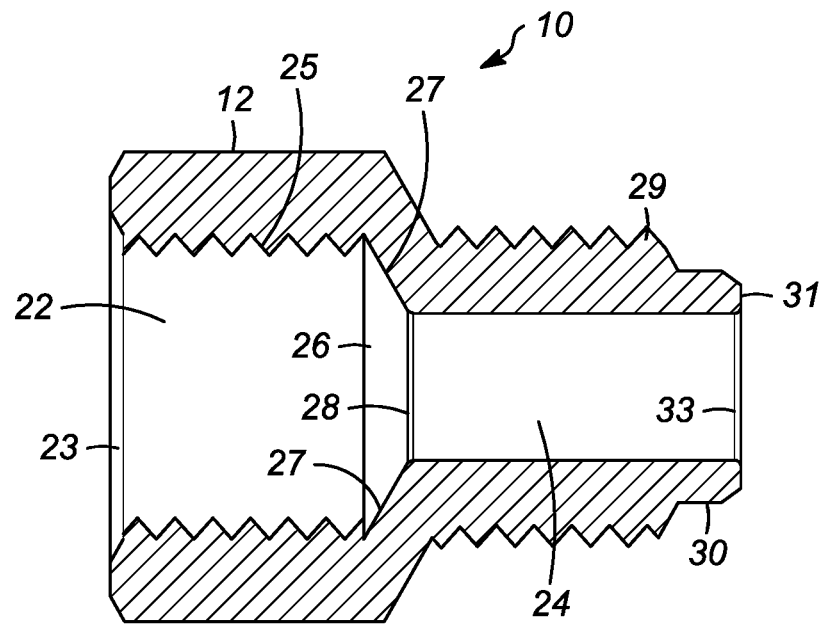
FIG. 2 is cross sectional view of the embodiment in FIG. 1 according to this disclosure.

Referring now to FIGS. 1 and 2, there is shown the reversable brake connector 10 made in accordance with the teachings of the preferred embodiment of the invention. The connector 10 is a fluidic connector that provides robust communication between a fluid source, such as a hydraulic control unit, and a device, such as a brake caliper. The connector 10 comprises a female end portion 12 and a male end portion 14. The male end portion 14 includes an internal bore 24 extending axially through the connector male portion to an internal threaded bore 22 on the female end portion 12.

As can be best seen at FIG. 2, the threaded bore 22 of female end portion 12 of connector 10 includes threaded surface 25 on the wall of the bore. The threaded bore 22 extends through the female end portion from an opening 23 to a frustoconical seat 26 having a wall 27 and an opening 28.

The male end portion 14 of the preferable design comprises a central bore 24, a threaded exterior surface 29, a head portion 30, and an abutting face 31. The central bore 24 forms the shape of a cylinder and passes entirely through the threaded male end portion 14 from an opening 33 to an opening 28 at the frustoconical seat 26. The threaded exterior surface 29 and central bore 24 are concentric, sharing a common central axis. The head portion 30 is disposed at one end of the male end portion 14. The abutting face 31 is disposed at the end of the head portion 30.

The connector 10 is preferably composed of a homogenous metallic material, however it may be composed of multiple pieces or of another material, such as plastic or other polymer material suitable for the application. The connector 10 may be integrally formed to the wall of a container for a fluid source or device or could also be coupled to the fluid source or device by any convenient method, whether fixed or removable. Alternatively, the connector body 12 may be used in a similar application such as connecting multiple conduits or branching a single fluid source to multiple destinations.

The diameter of the internal threaded bore 22 of female end 12 is of a like diameter as of the external threaded surface 29 of the male end portion 14. Thereby, allowing the male end portion 14 of a second connector 10 to be accepted by and threaded onto the threads 25 of threaded bore 22. Any common hand tool can be used to engage the exterior surface of female end portion 12 to facilitate the assembly.

Figure 3:
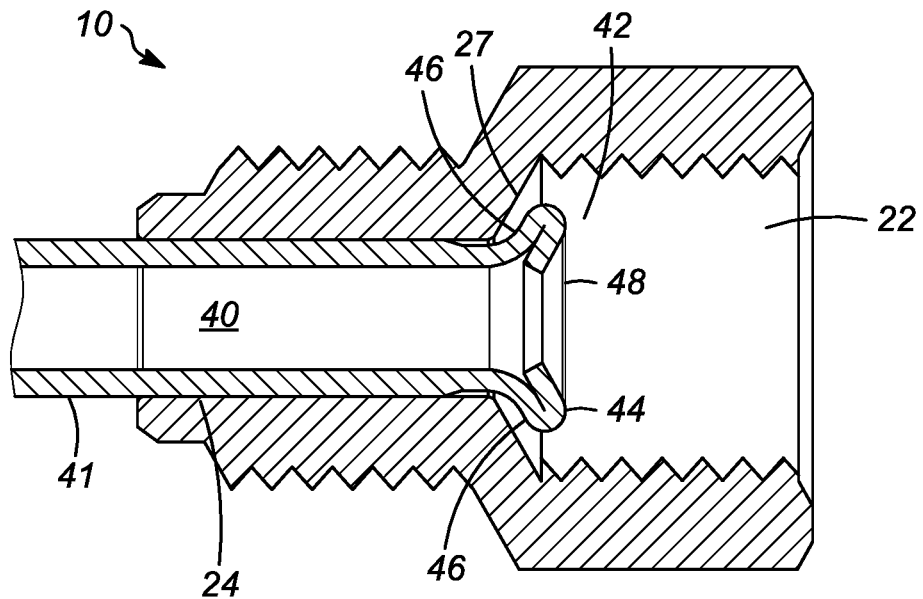
FIG. 3 is a cross sectional view of the embodiment of FIG. 1 including tubing having an SAE double/concave flare end according to this disclosure.

Turning to FIG. 3 the connector 10 of the present invention is shown with an elongated tube 41 installed into bore 24 of male end portion 14. The tube 41 comprises a double flared/concave end 42, of a JASO/SAE connector design whose sealing surfaces' shape is a frustum (portion of a cone with cut off vertex). Its double inverted flare (funnel or trumpet) has an inner (concave) frustum which is intended for sealing onto "external" (convex) frustum (seat) of frustoconical seat 26. An interior surface 44 of the flared end 42 extends into bore 22, with an exterior face 46 resting on walls 27 of the frustoconical seat 26. Tube 41 includes an opening 48 on the flare end 42 that opens into the interior 40 of the tube. The flared end 42 substantially forms a portion of a cone, defined by the interior face 44. Preferably the flared end 42 is formed integrally with tube body 40, however it may be coupled in another manner, such as through welding or mating threads. The elongated tube 41 is preferably a brake tube of a known type, however it can be of any type or material, homogeneous or otherwise, sufficient for use in vehicle braking applications or in any other similar application.

Figure 4:
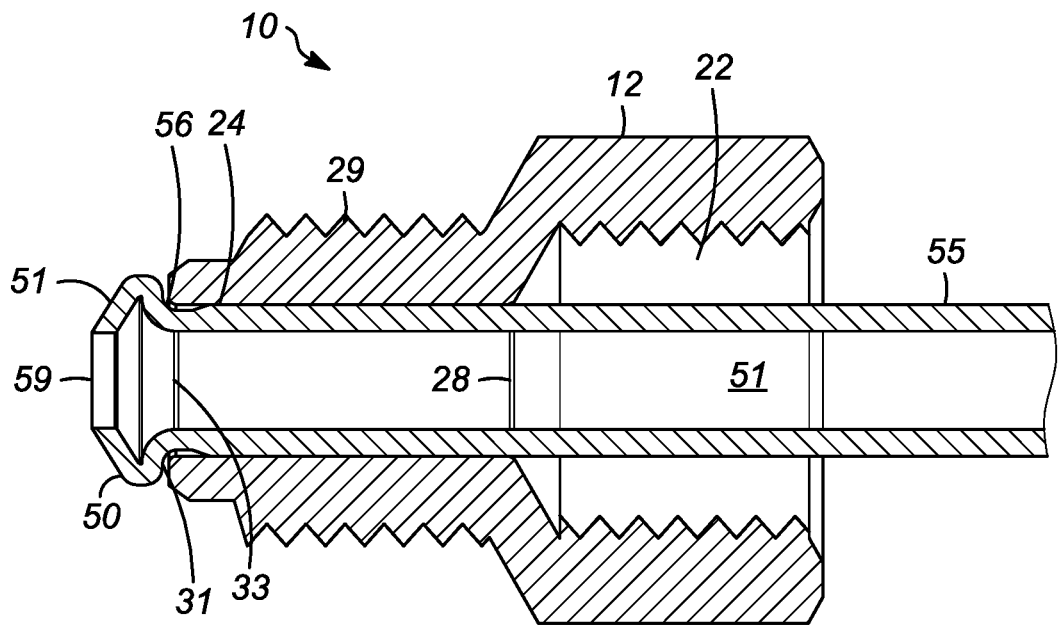
FIG. 4 is cross sectional view of the embodiment in FIG. 1 including tubing having an ISO spherical/convex flare end according to this disclosure.

With reference now to FIG. 4, the connector 10 of the present invention is shown with an elongated tube 55 installed into bore 22 of the of the female end portion 12. The tube 55 includes a flared end 50 of a second class of tube flare that uses a spherical/convex flare. This class is represented by the ISO connector design that incorporates a male type spherical/convex flare end that interacts with a female type concave flare end. A rear surface 56 of flare 50 abuts up abutting face 31 of head portion 30. Tube 55 extends from the flare end 50 through opening 33 and central bore 24 of the male end portion 14, through opening 28 and the threaded bore 22 and out of opening 25 of female end portion 12 of the connector 10. The tube 50 includes an opening 59 on flare end 50 that opens into the interior 51 of tube 55. The threaded exterior portion 29 and central bore 24 of the male end portion 14 are concentric, and co-axial in sharing a common central axis. Preferably the flared end 50 is formed integrally with elongated tube 55, however it may be coupled in another manner, such as through welding or mating threads. The elongated tube 55 is preferably a brake tube of a known type, however it can be of any type or material, homogeneous or otherwise, sufficient for use in vehicle braking applications or in any other similar application.

As can be appreciated by those skilled in this art, the present invention discloses a single connector fitting that can be used with both classes of flared sealing ends by the mere reversal of the connector ends to accommodate a particular brake tubing flare. The present invention can make a compressive connection between two tubes that are connected axially to each other and which each has a flare at its axial end on the connection side. A first connecting device 10, using the male end portion 14 using an ISO spherical/convex flared end can make a sealing connection engaging a second connector female end portion 14 and a SAE double/concave flared end.

Figure 5:
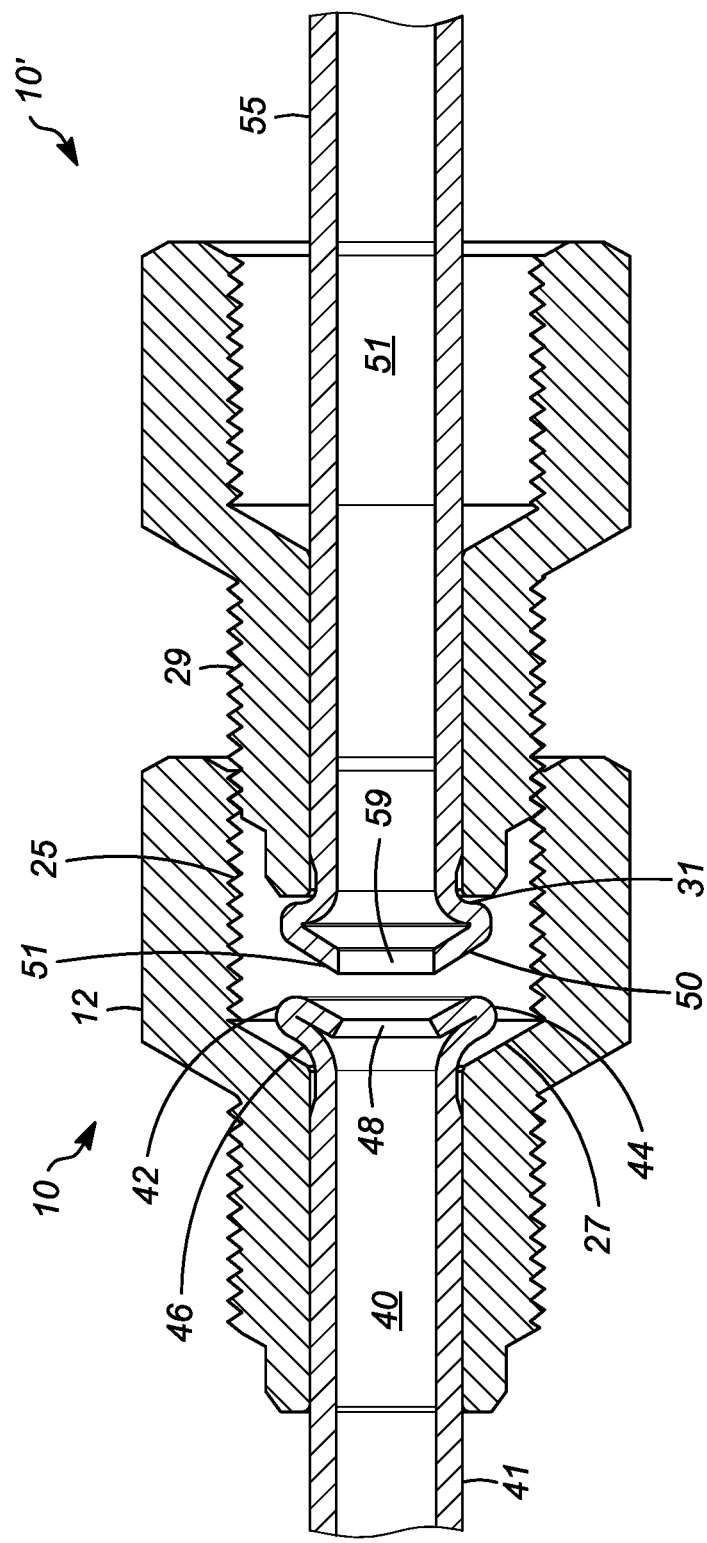
FIG. 5 is a cross sectional view of the installation and partial assembly of two reverse tube connectors illustrating an example method for making a union connection between an SAE double/concave flare tubing end and an ISO spherical/convex flare tubing end according to this disclosure.

Turning now to FIG. 5, a partial assembled union installation is shown facilitating the connection of a first connector 10 having an SAE double/concave flared tube end 42 connected to a second connector 10' having an ISO spherical/convex tube flare 50. The male end portion 14 and thread surface 29 of connector 10' is thread onto the threaded bore 22 of connector 10 allowing threads 29 to engage threads 25. As the connector 10' is threaded further into bore 22 of connector 10 front surface 51 of flare end 50 engages interior surface 44 of flare end 42. A compressive connection between flare ends 50 and 42 is completed by the abutting face 31 pressing against flare 50 to compress against interior flare surface 44. Flare interior surfaces 46 compresses against walls 27 of frustoconical seat 26 allowing the flare ends 42, 50 of tubes 41 and 55, respectively to be pressed against each other in an axial direction, at least indirectly at their end faces. The interaction defined by frustoconical seat 26 and the zone of a sphere provided by the abutting surface 31 provides for a circumscribing, i.e. a ring-shaped contact between flare ends 42 and 50, through a compressive alignment, thereby limiting the potential for leak path occurring between the two tubes flares. Each of the two tubing flares 42 and 50 have annular openings 48 and 59 respectively, that align along the openings to provide access for fluid to flow between and through tubes 40 and 51. When connector 10' is sufficiently threaded into connector 10 the two flares 42 and 50 create a leak-free and permanently tight connection between the two tubes 41 and 55.

Modifications to embodiments of the invention described in the foregoing are possible without departing from the scope of the invention as defined by the accompanying claims. The scope of patented subject matter is defined only by the allowed claims. Moreover, none of the claims invokes 35 U.S.C. § 112(f) with respect to any of the appended claims or claim elements unless the exact words or expressions such as "including", "comprising", "incorporating", "consisting of", "have", "is" used to describe and claim the present invention are intended to be construed in a non-exclusive manner, namely allowing for items, components, or elements not explicitly described also to be present. Reference to the singular is also to be construed to relate to the plural.

Although this disclosure has described and illustrated certain preferred embodiments of the invention, it is to be understood that the invention is not restricted to those particular embodiments. Rather, the invention includes all embodiments, which are functional or mechanical equivalence of the specific embodiments and features that have been described and illustrated.

What is claimed is:

1. A fluid connector assembly comprising:
   a reversible connector body including a female end portion having a non-threaded outer surface and a male end portion having a threaded outer surface connected to the non-threaded radially outermost surface of said female end portion by a wall obliquely extending directly from the threaded outer surface of said male end portion, said male end portion threaded surface having an outer diameter that is smaller than said non-threaded outer diameter of said female end portion;
   said female end portion including an internal threaded bore extending through said female end portion from an annular opening to an inner seat, said inner seat having a portion defining a concave frustoconical surface;
   said male end portion including an internal bore axially aligned with said female end portion threaded bore extending from an opening at a head portion of said male end portion to an opening at the female end portion inner seat, said male end portion including an abutting face located about the opening at said head portion said external threaded surface extending from said head portion to said female end portion;
   a concave flared end of a first tube resting on said frustoconical surface, said first tube extending through said male end portion internal bore exiting said male end portion at the opening at the head portion of said reversible connector body;
   a spherical or alternatively a convex flared end of a second tube resting on an abutting face of another reversible connector body said second tube extending through said male end portion internal bore and through the female portion inner seat opening exiting at the female end portion of said another reversible connector body; and
   wherein the internal threaded bore of said female end portion is arranged to have said threaded surface of a male end portion of said another reversible connector body installed into said female end portion threaded bore through said female end portion opening said head portion and abutting face of said another reversible connector body driving said spherical/convex flare end into the concave flared end.

2. The fluid connector assembly of claim 1 wherein said internal bore of said female end portion has a larger internal diameter than the internal bore of said male end portion.

3. The fluid connector assembly of claim 1 wherein said inner seat frustoconical surface is comprised of a surface wall arranged to accept an inner surface of said first tube flared end against said surface wall.

4. The fluid connector assembly of claim 3 wherein the first and second tubes may be a brake tube.

5. The fluid connector assembly of claim 1 wherein said male end portion and said female end portion of said reversible connector body is manufactured as a single unit of a homogenous metallic material.

* * * * *